United States Patent
Mitobe et al.

(10) Patent No.: US 6,918,690 B2
(45) Date of Patent: Jul. 19, 2005

(54) VEHICLE LAMP

(75) Inventors: Toshiaki Mitobe, Shizuoka (JP); Michihiro Mabe, Shizuoka (JP); Koichi Nakamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/449,960

(22) Filed: May 30, 2003

(65) Prior Publication Data

US 2004/0042228 A1 Mar. 4, 2004

(30) Foreign Application Priority Data

May 30, 2002 (JP) ..................................... P. 2002-157579

(51) Int. Cl.[7] .............................. F21V 9/00; H01J 5/16
(52) U.S. Cl. ..................... 362/510; 362/293; 362/499; 313/110
(58) Field of Search .............................. 362/510, 293, 362/255, 498, 499, 540, 541, 542, 2, 230, 231; 313/110, 112, 635

(56) References Cited

U.S. PATENT DOCUMENTS

| | | | | |
|---|---|---|---|---|
| 4,598,020 A | * | 7/1986 | Panush | 428/411.1 |
| 4,868,725 A | * | 9/1989 | Sakagawa et al. | 362/231 |
| 6,411,021 B1 | | 6/2002 | Izawa et al. | 313/315 |
| 6,445,112 B1 | * | 9/2002 | Amrein et al. | 313/110 |
| 6,520,664 B1 | * | 2/2003 | Amrein et al. | 362/293 |
| 6,580,201 B2 | * | 6/2003 | Nakamura et al. | 313/112 |
| 2001/0020812 A1 | * | 9/2001 | Sagawa et al. | 313/110 |

FOREIGN PATENT DOCUMENTS

JP          2002-15709          1/2002

* cited by examiner

Primary Examiner—Thomas M. Sember
Assistant Examiner—Bao Q Truong
(74) Attorney, Agent, or Firm—Fish & Richardson P.C.

(57) ABSTRACT

A vehicle lamp has a red bulb which is made by coating its exterior surface with a red paint including iron oxide as a red pigment. A mean particle size of the iron oxide is controlled to a range of approximately 10 to 100 nm, and a PWC concentration of the iron oxide is controlled to a range of approximately 60 to 90%. As a result, a red marker lamp can have an appropriate luminous flux (120±20% lm) and desirable chromaticity (y<0.335 and z<0.008) and satisfactory heat resistance (350° C. or higher).

20 Claims, 8 Drawing Sheets

FIG. 7

| PIGMENT CONCENTRATION (%) / PARTICLE SIZE (nm) | 40 | 60 | 80 | 90 | 100 |
|---|---|---|---|---|---|
| 5 | COLOR NG | COLOR NG | COLOR NG | COLOR NG | INITIAL ADHESION NG |
| 10 | COLOR NG | ○ | ○ | ○ | INITIAL ADHESION NG |
| 20 | COLOR NG | ○ | ◎ | ○ | INITIAL ADHESION NG |
| 100 | HEAT RESISTANCE TEST NG | ○ | ○ | ○ | INITIAL ADHESION NG |
| 1000 | HEAT RESISTANCE TEST NG | INITIAL ADHESION NG | INITIAL ADHESION NG | INITIAL ADHESION NG | INITIAL ADHESION NG |

FIG. 8

| TYPE OF ENCAPSULATED GAS | Ar GAS | Ar GAS | Kr GAS | Kr GAS |
|---|---|---|---|---|
| TYPE OF FILAMENT | NORMAL | HIGH-EFFICIENCY | NORMAL | HIGH-EFFICIENCY |
| EVALUATION ITEMS | LUMINOUS FLUX | LUMINOUS FLUX | LUMINOUS FLUX | LUMINOUS FLUX |
| FILM THICKNESS OF 0.5 | × × ○ | × × ○ | × × ○ | ○ × ○ |
| FILM THICKNESS OF 1 | × × ○ | × × ○ | × × ○ | ○ ○ ○ |
| FILM THICKNESS OF 5 | × ○ ○ | × ○ ○ | × × ○ | ○ ○ ○ |
| FILM THICKNESS OF 10 | × ○ ○ | × ○ ○ | × ○ ○ | × ○ ○ |
| FILM THICKNESS OF 20 | ADHESION NG | ADHESION NG | ADHESION NG | ADHESION NG |

VEHICLE LAMP

FIELD OF THE INVENTION

The invention relates to a vehicle lamp having a red bulb with its exterior surface coated with red paint, and more particularly, to a vehicle lamp using iron oxide in the red paint used for coating the bulb.

BACKGROUND OF THE INVENTION

Marker lamps provided on the rear end of an automobile include tail lamps for displaying the rear end of the vehicle, stop lamps which illuminate in conjunction with braking action, tail-and-stop lamps made by integrating the stop lamps and the tail lamps, and rear fog lamps. The marker lamps convert white light from a bulb into red light.

A recent trend is to make a combination lamp in which marker lamps are integrated with backing lamps or clearance lamps whose functional color is white.

With respect to the combination lamp, when a plurality of lens sections having different functional colors are formed integrally with an outer lens through multicolor molding, this molding process of the outer lens can be troublesome to execute and may add costs. Furthermore, an inner lens can be added to components constituting a red marker lamp, thereby resulting in an increased number of components and a cost hike. Further, a fixture for fixing an inner lens would be needed, thereby increasing structural restrictions.

Furthermore, the conventional red marker lamp has trouble achieving desirable luminosity, chromaticity, and heat resistance.

SUMMARY OF THE INVENTION

A red paint film according to the present invention achieves desirable luminous flux, chromaticity, and heat resistance by controlling a mean particle size of iron oxide contained in the paint film and a PWC concentration (a concentration (wt %) of pigment against a solid component) of iron oxide.

The invention provides a vehicle lamp equipped with a red bulb with its exterior surface coated with red paint exhibiting superior luminous flux, chromaticity, and heat resistance.

A vehicle lamp having a red bulb its exterior surface coated with a red paint includes iron oxide as a red pigment. A mean particle size of the iron oxide is controlled to a range of approximately 10 to 100 nm, and a PWC concentration of the iron oxide is controlled to a range of approximately 60 to 90%.

The white light from a light-emitting member of the bulb assumes a red color by passing through a coating film which is formed on an exterior surface of the bulb and coated with a red pigment (iron oxide). As a result of the light being repeatedly subjected to reflection caused by iron oxide particles in the paint film, light of low wavelength is absorbed to increase the proportion of light of high wavelength (i.e., a red color) Therefore, the light assumes a red color. For this reason, when the mean particle size of iron oxide in the paint film is less than approximately 10 nm, light comes into contact with the iron oxide particles an excessive number of times, and hence, a luminous flux of 100 lm or more cannot be achieved. In short, the luminous flux is degraded. In contrast, when the mean particle size of iron oxide in the paint film exceeds approximately 100 nm, the number of times transmitted light comes into contact with iron oxide particles is increased on a per-transmitted-light-ray basis. There a rises a so-called variation in the luminous flux, which is a variation in the degree to which the light assumes a red color.

The PWC concentration (i.e., a wt % concentration of a red pigment with respect to a solid component) affects adhesion of the pigment on the surface of the bulb and chromaticity of the pigment. However, if the PWC concentration is less than approximately 60%, desired chromaticity (y<0.335 and z<0.008) cannot be achieved. In contrast, if the PWC concentration exceeds approximately 90%, undesired exfoliation of paint film, poor adhesion, degradation in durability, and insufficient heat resistance (350° C. or higher) arise in addition to the difficulty of achieving the desired chromaticity (y<0.335 and z<0.008)

For this reason, the PWC concentration of iron oxide included in the paint film formed over the exterior surface of the bulb is adjusted to range from approximately 60 to 90% with a mean particle size of approximately 10 to 100 nm, thereby achieving an appropriate luminous flux (120±20% lm) and chromaticity (y<0.335 and z<0.008) and a satisfactory heat resistance (350° C. or higher).

In another embodiment, the vehicle lamp has a uniform colored (clear or pale red) front lens disposed in front of the red bulbs.

The lamp chambers are clearly visible through a clear or pale red front lens, thereby imparting depth to the lamp chambers and provide an appearance of quality.

In a single combination vehicle lamp (e.g., a red marker lamp, a backing lamp, and lamps of other features) using a red bulb as the light source, a front lens section corresponding to the red marker lamp can be clear. Hence, multiple color molding often used for forming a red portion of the front lens of the clear combination lamp can be avoided.

BRIEF DESCRIPTION OF THE DRAWINGS

FIG. 7 is a diagram showing a mean particle size of a red pigment (iron oxide) included in a red paint used for coating a bulb and desirable ranges of PWC concentrations.

FIG. 8 shows a relationship between a thickness of a red paint film, luminous flux, chromaticity, and adhesion.

DETAILED DESCRIPTION OF THE INVENTION

Figure 1:
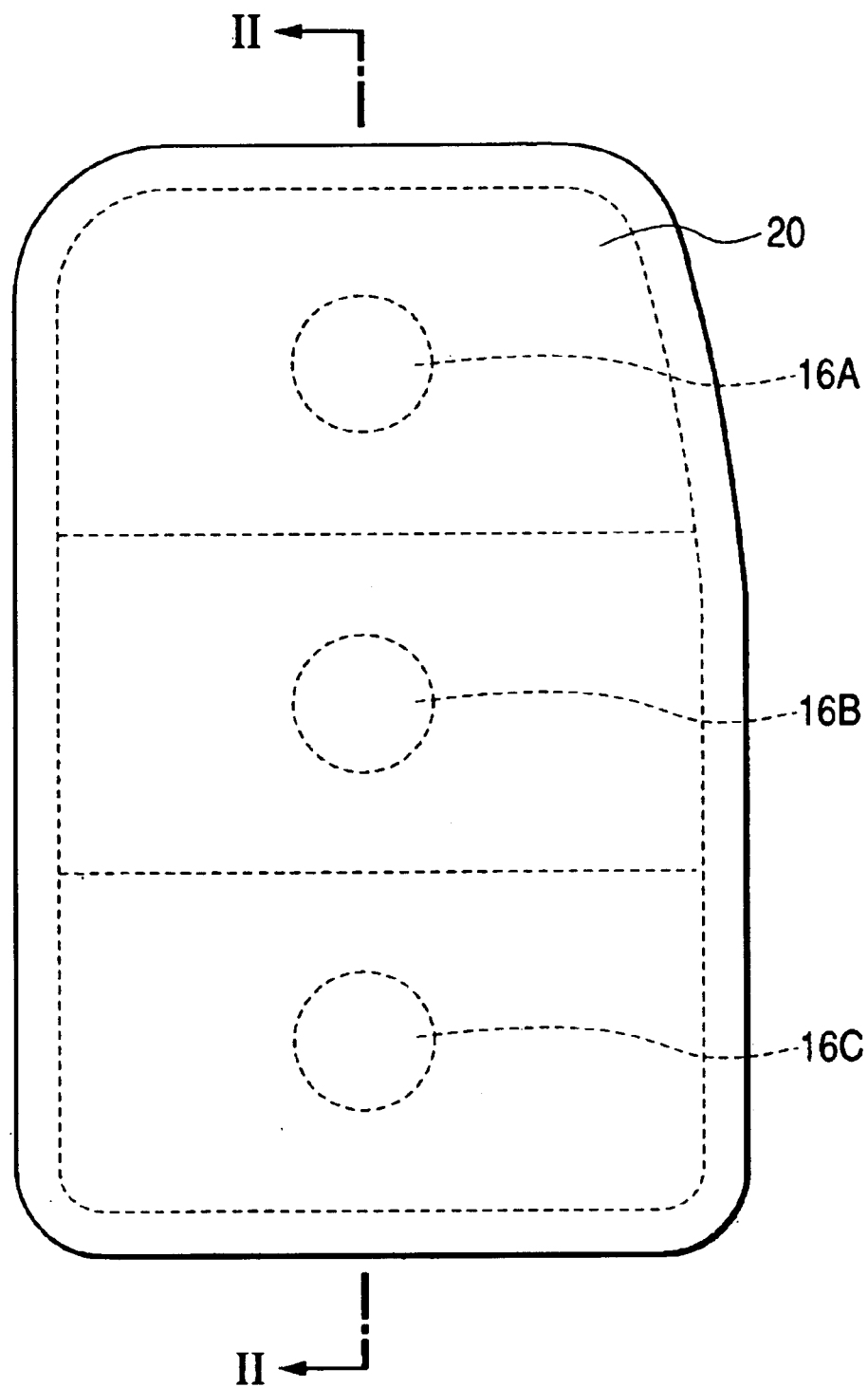
FIG. 1 is a front view of a rear combination lamp for use in an automobile according to an embodiment of the present invention.
Figure 2:
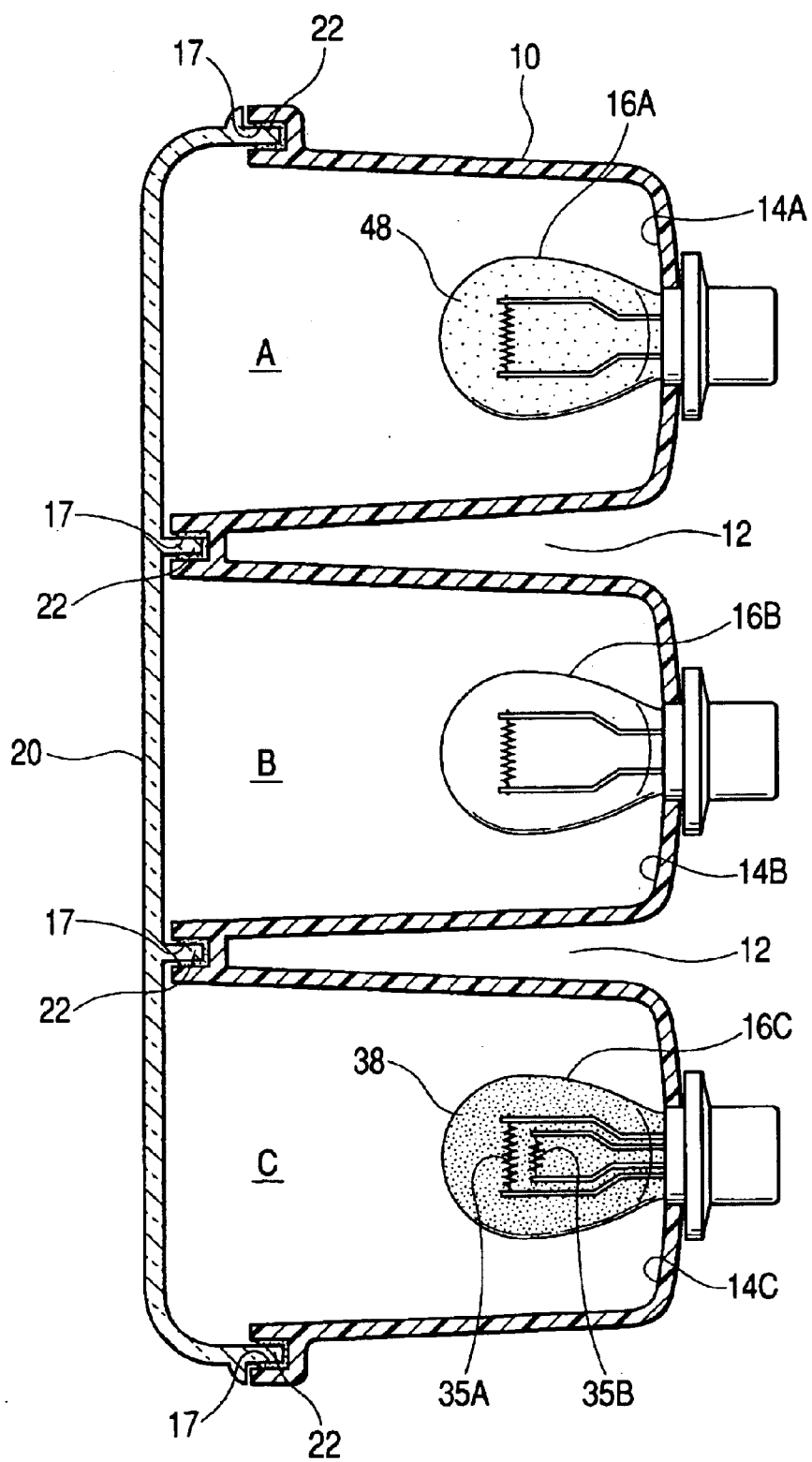
FIG. 2 is a longitudinal a cross-sectional view taken along line II—II shown in FIG. 1.
Figure 3:
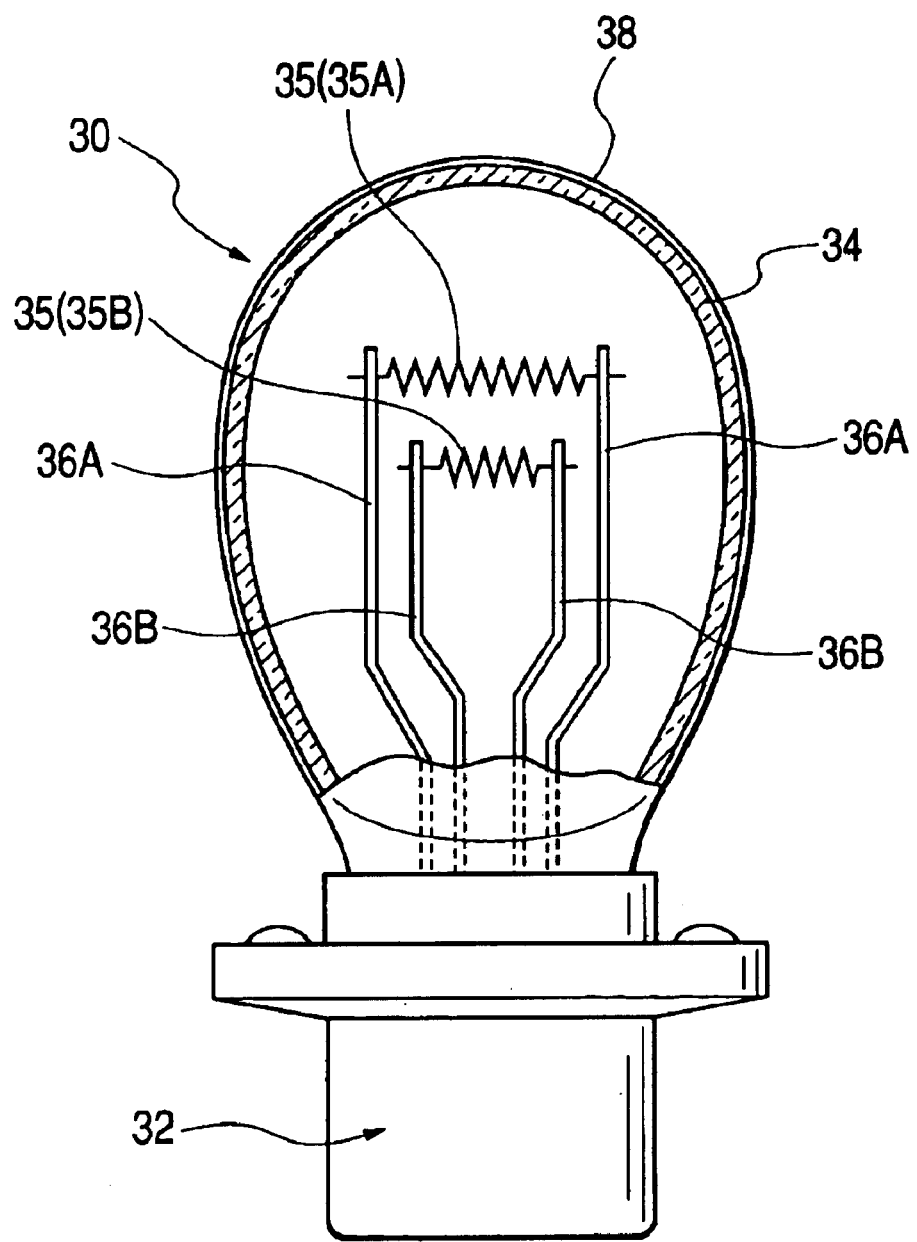
FIG. 3 is an enlarged partially fragmentary side view of a red bulb for use as a tail-and-stop lamp according to an embodiment of the present invention.
Figure 4A:
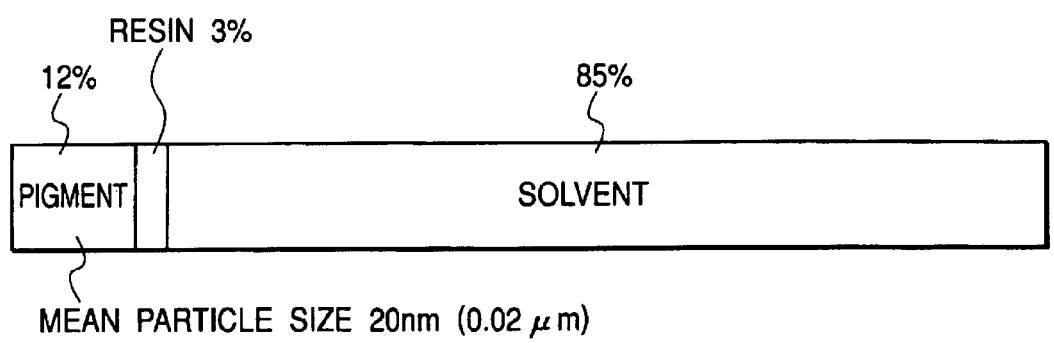
FIG. 4A is a view showing the structure of a red paint of the embodiment of the present invention.
Figure 4B:
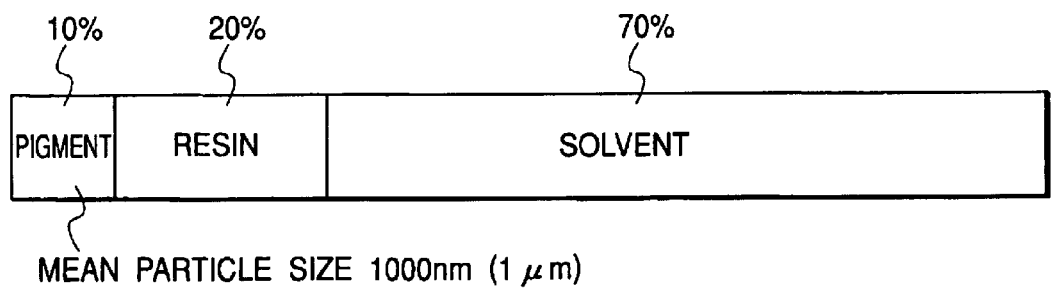
FIG. 4B is a view showing the structure of a conventional red paint.
Figure 5A:
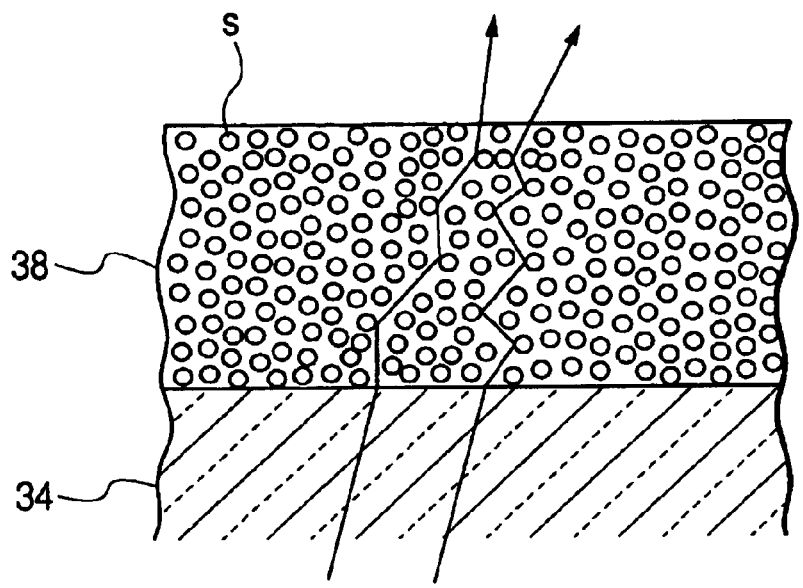
FIG. 5A is a cross-sectional view showing how light passes through a red paint film formed over a red bulb of the embodiment of the present invention.
Figure 5B:
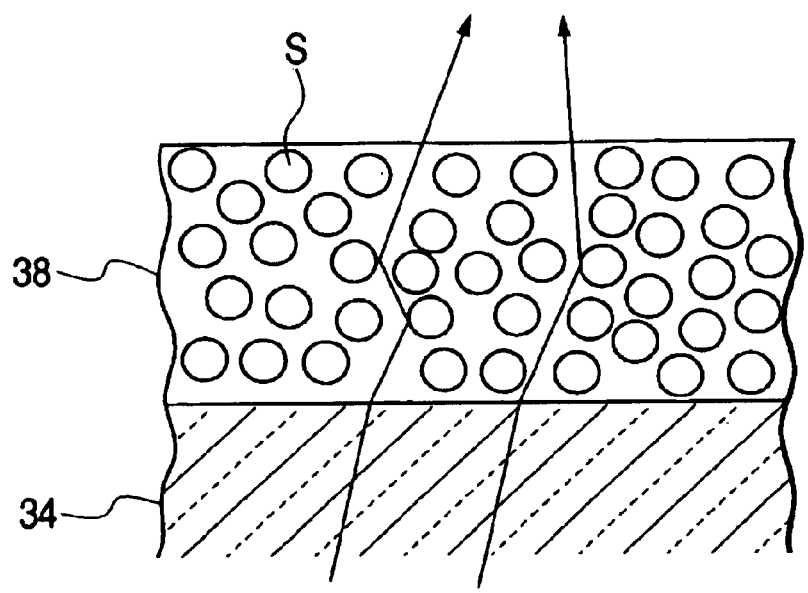
FIG. 5B is a cross-sectional view showing how light passes through a red paint film formed over a conventional red bulb.
Figure 6:
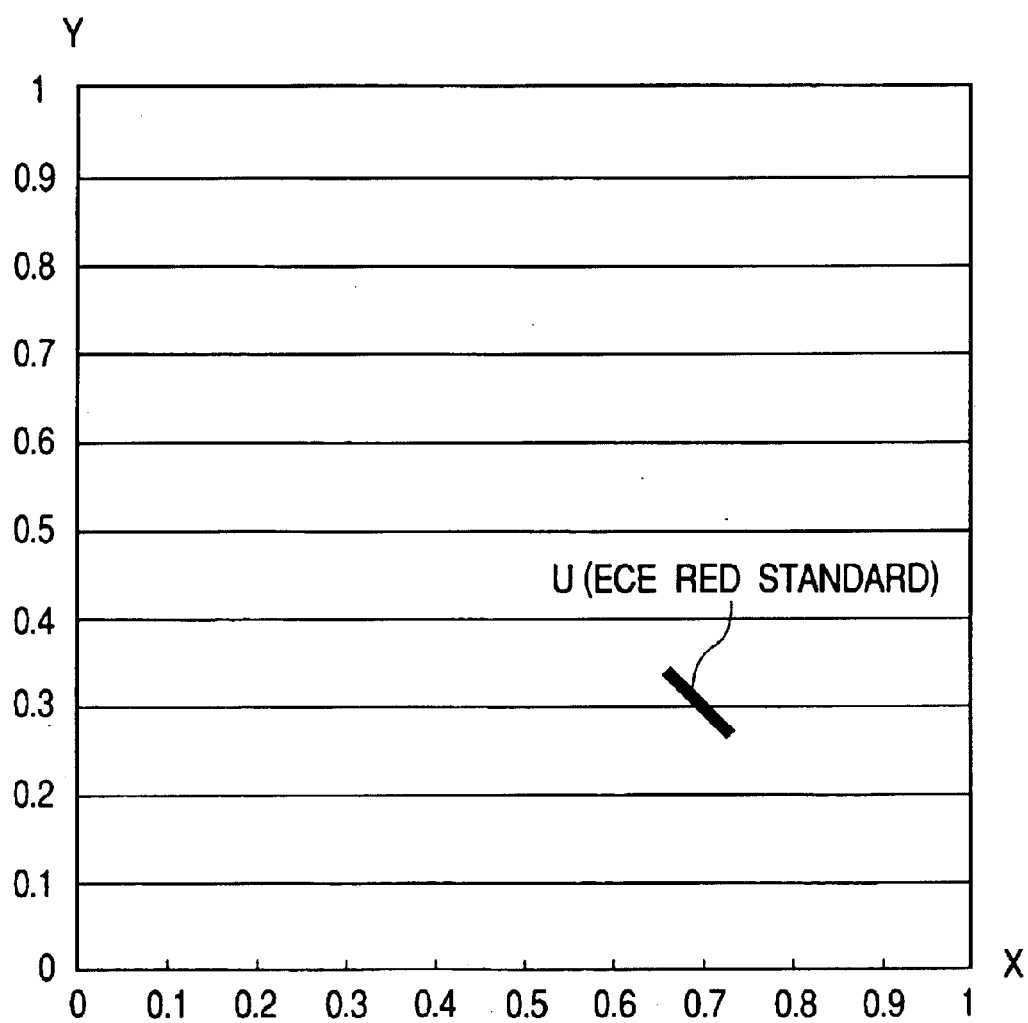
FIG. 6 is a coordinate chart, in which chromaticity-coordinate-transformed values x, y, and z corresponds to the tri-stimulus values X, Y, and Z of an illuminant color, and the value "y" is taken from a vertical axis, and the value "x" is taken from a horizontal axis.

FIGS. 1 through 8 show an embodiment of the invention. FIG. 1 is a front view of a rear combination lamp. FIG. 2 is a longitudinal cross-sectional view of the lamp (a cross-sectional view taken along line II—II shown in FIG. 1). FIG. 3 is an enlarged partially fragmentary side view of a red bulb for use as a tail-and-stop lamp. FIG. 4 is a view for showing the structure of a red paint in comparison with a conventional red paint. FIG. 4A is a view showing the structure of a red paint of the embodiment, and FIG. 4B is a view showing the structure of a conventional red paint. FIG. 5 is a cross-sectional view showing how light passes through the red paint film applied over the bulb. FIG. 5A shows a case where the iron oxide included in the red paint film has a large mean particle size, and FIG. 5B shows a case where the iron oxide included in the red pain film has a small mean particle size. FIG. 6 is a coordinate chart.

In chromaticity-coordinate-transformed values x, y, and z corresponding to the tri-stimulus values X, Y, and Z of an illuminant color, the value "y" is taken from a vertical axis and the value "x" is taken from a horizontal axis, thereby conforming to an ECE red standard. FIG. 7 is a diagram showing a mean particle size of a red pigment (iron oxide) included in a red paint used for coating a bulb in red, and desirable ranges of PWC concentrations. FIG. 8 is a view showing a relationship between a thickness of a red paint film, a luminous flux, chromaticity, and adhesion.

FIGS. 1 and 2 shows an elongated-container-shaped lamp body 10 of a rear combination lamp. The inside of the lamp body 10 is partitioned into a lamp chamber space A for a turn signal lamp; a lamp chamber B for a backing lamp; and a lamp chamber C for a tail-and-stop lamp, in descending order from the top, by means of horizontally-extending partitions 12. Reflectors 14A, 14B, and 14C, each having a multiple reflection surface, are formed on an internal circumferential surface of the lamp body 10 constituting the lamp chamber spaces A, B, and C. Bulbs 16A, 16B, and 16C, each serving as the light source, are fitted into bulb insert holes formed in rear top sections of the respective reflectors 14A, 14B, and 14C. A seal groove 17 is formed in a front opening brim section of the lamp body 10 and front ends of the respective partitions 12 defining the lamp chambers. A front lens 20 and the lamp body 10 are assembled into a single unit such that seal legs 22 of the front lens 20 are engaged with the seal grooves 17.

The entire front lens 20 is formed in a clear color which is a functional color of the backing lamp, thereby achieving uniform color over the entire combination lamp. Light distribution is effected by the multiple reflection surfaces of the reflectors 14A, 14B, and 14C. Hence, the front lens 20 is formed from a non-step lens having no steps for diffusion purposes, and the inside of the lamp chambers A, B, and C is translucently visible from the outside, thereby imparting an appearance of quality and depth to the entire combination lamp.

The bulb 16B for use as a backing lamp is made from a white bulb of a functional color. The bulb 16A for use as a turn signal lamp is made from an amber bulb, where an amber color is a functional color for the turn signal lamp. The bulb 16C for use as a tail-and-stop lamp is made from a red bulb, where a red color is a functional color for the tail-and-stop lamp. The amber bulb 16A is made by coating an exterior surface of a white bulb with an amber paint film 48. The red bulb 16C is made by coating an exterior surface of a white bulb with a red paint film 38. Light from a filament, a light-emitting member, passes through the amber paint film 48, whereupon the light assumes an amber color. Light from the filament passes through the red paint film 38, whereupon the light assumes a red color.

The structure of the red bulb 16C of the tail-and-stop lamp will now be described in reference to FIG. 3.

As shown in FIG. 3, the red bulb 16C has a structure in which the bulb 34 has a built-in filament 35 and is provided integrally in front of a bulb socket 32. The red bulb 16C is formed into a double-filament type, where both ends of respective filaments 35A, 35B are supported by lead supports 36A, 36B within the bulb 34. When a lighting switch of the tail-and-stop lamp is turned on, the filament 35A illuminates, whereupon (a front lens area of) the tail-and-stop lamp lights up red. Thus, the tail-and-stop lamp works as a tail lamp that alerts other drivers. When a brake pedal is pressed, the filament 35B is also illuminated together with the filament 35A so that the amount of light from the red bulb 16C is increased. Correspondingly, the amount of red light from the tail-and-stop lamp is also increased. As a result, the tail-and-stop lamp acts as a stop lamp for alerting other drivers to the braking action.

As shown in FIG. 3, the red bulb 16C is made by coating an exterior surface of a clear, transparent bulb 34 with the red paint film 38 (i.e., by forming a paint film on the exterior surface). The red paint film 38 is formed by immersing the bulb 34 into a red paint fluid and drying the thus-dipped bulb at a predetermined temperature and for a certain time. In addition to dipping, air-spray painting, disk painting, or spin painting can also be employed as a method for forming the film.

A composition of red paint will now be described in reference to FIGS. 4 through 8.

As shown in FIG. 4, the red paint is composed of transparent base resin, a volatile base material made of an organic solvent, a pigment serving as a color component, and an additive such as a dispersing agent. The base resin acts as a binder having a coat forming characteristic, such as a silicon-based binder, an acrylic-silicon-based binder, or a polyester-silicon-based binder. Pigment is prepared to achieve a desired red chromaticity by mixing iron oxide in a predetermined proportion.

As shown in FIG. 4A, the red paint of the embodiment consists of 12 wt % iron oxide having a mean particle size of 20 nm (0.02 $\mu$m), 3 wt % binder (transparent base resin), and 85 wt % organic solvent (volatile base material). The dispersing agent and other additives are present in amounts that are minute and negligible. The red paint film 38 is formed in multiple layers on the exterior surface of the bulb 34 as a result of the organic solvent (volatile base material) being vaporized through the drying operation. Here, the PWC concentration (i.e., a wt % concentration of red pigment with respect to a total weight consisting of red pigment and a binder, both being solid components) of iron oxide contained in the red paint (i.e., the red coating film 38) is 80%.

As shown in FIG. 4B, the conventional red paint consists of 10 wt % iron oxide having a mean particle size of 1000 nm (1 $\mu$m), 20 wt % binder (transparent base resin), and 70 wt % organic solvent (volatile base material). The red paint of the invention is noticeably different from the conventional red paint (or a red paint film) in which iron oxide has a PWC concentration of about 33%, in terms of the mean particle size and the PWC concentration.

The white light originating from the filaments 35A, 35B assumes a red color by passing through the red paint film 38 formed on the surface of the bulb 34. The iron oxide of the invention is very fine and has a mean particle size of 20 nm (0.02 μm), as compared with the iron oxide of a conventional red component, which has a mean particle size of 1000 nm (1 μm). Therefore, as shown in FIG. 5B, the light passing through a conventional red paint film is usually subject to a small number of reflections and interferences because of the large mean particle size of the iron oxide particles S, and a large difference arises between transmitted light rays in terms of a degree to which the light assumes a red color. The red color assumed by the transmitted light changes from one transmitted light ray to another, resulting in so-called variations in luminous flux. On the other hand, as shown in FIG. 5A, the light—passing through the red paint film of the embodiment is generally subject to a large number of reflections and interferences because of the small mean particle size of the iron oxide particles S. Accordingly, the difference that arises between the transmitted light rays in terms of the degree to which the light rays take on a red color is small, and the red color assumed by the transmitted light is smoothed, thus preventing the variations in luminous flux.

The PWC concentration of red pigment (i.e., a wt % concentration of red pigment with respect to a solid component) affects the adhesion of the red paint film on the surface of the bulb and the chromaticity of the red paint film. Specifically, as seen in FIG. 6, a coordinate chart, in chromaticity-coordinate-transformed values x, y, and z corresponding to the tri-stimulus values X, Y, and Z of an illuminant color, the value "y" is taken from a vertical axis, and the value "x" is taken from a horizontal axis. The area denoted by reference symbol U shows a chromaticity range defined by the ECE red standard (y<0.335 and z<0.008, where x+y+z=1). Illumination of the red bulb 16C (i.e., the light originating from the red paint film 38) should fall within the chromaticity range conforming to the ECE red standard (y<0.335 and z<0.008, where x+y+z=1).

The PWC concentration of red pigment (iron oxide) included in the red paint (or the red paint film) can be as low as 33%. The ease of fixing (adhesion) of the red paint film on glass is improved as the amount of binder becomes greater. However, a predetermined chromaticity (i.e., y<0.335 and z<0.008) cannot be achieved. In contrast, if the red paint of the embodiment has a PWC concentration of 80%, sufficiently satisfactory chromaticity (i.e., y<0.335 and z<0.008) can be obtained. Further, data shown in FIG. 7 reveal no exfoliation of red paint film, superior adhesion, and sufficient durability and heat resistance (350° C. or higher).

FIG. 7 shows a mean particle size of red pigment (iron oxide) included in a red paint used for coating the bulb 34 and desirable ranges of PWC concentrations.

As shown in FIG. 7, when the mean particle size of red pigment (iron oxide) included in the red paint (red paint film 38) is less than approximately 10 nm, a desired chromaticity (y<0.335 and z<0.008) cannot be achieved. When the mean particle size of the red pigment (iron oxide) included in the red paint film 38 exceeds approximately 100 nm, variations arise in luminous flux in the manner mentioned previously. Further, adhesion of the red paint film on the surface of the bulb 34 can be poor, and the red paint film can exfoliate and become inferior in terms of durability and heat resistance.

When the PWC concentration is less than approximately 60%, desired chromaticity (y<0.335 and z<0.008) or heat resistance may not be obtained. On the other hand, when the PWC concentration exceeds approximately 90%, the paint film becomes susceptible to exfoliation and suffers from poor adhesion. Thus, the durability and heat resistance (350° C. or higher) of the paint film become degraded.

The desirable mean particle size of the red pigment (iron oxide) included in the red paint used for coating the bulb 34 is 20 nm, and the desirable PWC concentration of the same is 80%, as described in connection with the embodiment. However, the invention is not limited to these values. As shown in FIG. 7, so long as the mean particle size of red pigment ranges approximately 10 to 100 nm and the PWC concentration of the same ranges from approximately 60 to 90%, an appropriate luminous flux (120±20% lm) and appropriate chromaticity (y<0.335 and z<0.008) can be obtained, and satisfactory heat resistance (350° C. or higher) can be achieved as well.

FIG. 8 shows a relationship between the thickness of a red paint film 38, luminous flux, chromaticity, and adhesion. FIG. 8 shows results of examination of the relationship between the thickness of the red paint film, the luminous flux, chromaticity, and adhesion performed on four types of bulbs: an ordinary bulb having a built-in filament filled with an inactive gas, particularly, an Ar gas; a high-efficiency bulb having a built-in filament filled with an Ar gas; an ordinary bulb having a built-in filament filled with a Kr gas; and a high-efficiency bulb having a built-in filament filled with a Kr gas. Here, the high-efficiency bulb is a bulb whose efficiency (1m/w) is increased for compensating for a drop in luminous flux stemming from formation of a red paint film. If only the efficiency of the bulb is increased, the life of the bulb will be shortened. For this reason, the life of the high-efficiency bulb is ensured by increasing the internal pressure of the bulb to three to four atmospheres.

As illustrated, in order to satisfy all the requirements—an appropriate luminous flux (120±20% lm), chromaticity (y<0.335 and z<0.008), and heat resistance (350° C. or higher)—a high-efficiency bulb having a built-in filament filled with a Kr gas can be employed, and the red paint film should have a thickness ranging from approximately 1 to 5 μm. When the thickness of the film is less than 1 μm, all four types of bulbs suffer from a deficiency in chromaticity. Hence, in order to achieve some desired chromaticity, a thickness of approximately 5 μm or more may be required. However, when the film thickness exceeds 5 μm, all four types of bulbs become prone to cracks arising in the paint film, poor adhesion, insufficient durability, and insufficient heat resistance. A high-efficiency bulb having a built-in filament filled with a Kr gas can achieve an appropriated luminous flux (120±20% lm).

In the embodiment, the red bulb 16C includes a high-efficiency bulb having a built-in filament filled with a Kr gas. The thickness of the red paint film 38 formed on the bulb 34 can be set to 3 μm, thereby satisfying the appropriate luminous flux (120±20% lm), chromaticity (y<0.335 and z<0.008), and heat resistance (350° C. or higher).

The amber bulb 16A of the turn signal lamp has a structure in which a bulb has a built-in filament and is integrally provided in front of a bulb socket. The filament blinks in conjunction with operation of a turn indicator, and therefore, the entire turn signal lamp blinks. The other drivers can be alerted of a lane change, a left turn, or a right turn.

Similarly to the red paint of the red bulb, the amber bulb 16A can be made by coating the exterior surface of the clear, transparent bulb with an amber paint (i.e., by forming an amber coating film), thereby satisfying the chromaticity defined by the ECE amber color standard. Detailed configuration of the amber color bulb 16A is described in JP-A-2002-15709, which is incorporated herein by reference.

Because the lamp chambers A, B, and C of the combination lamp of the embodiment are clearly visible from the outside, depth and an appearance of quality are imparted to the lamp.

Conventionally, a front lens of a combination lamp has to be formed by troublesome multiple color molding process in order to impart an amber color and a red color to front lens sections, which respectively correspond to a turn signal lamp and a tail-and-stop lamp. In contrast, according to the embodiment, the entire front lens of the combination lamp can be formed clear, thereby avoiding the trouble some multiple color molding process and reducing costs of the lamps.

In the extinguished state, the entire combination lamp is uniformly clear. In this respect, the combination lamp of the invention is different from a conventional combination lamp with a multiple-color-molded front lens and a colored inner lens.

In the embodiment, the vehicle lamp of the invention has been described as a combination lamp integrated with vehicle lamps of other functions. The invention may be applied to a single red marker lamp which illuminates red light, such as a tail lamp, a stop lamp, a tail-and-stop lamp, or a rear fog lamp.

Figure 9:
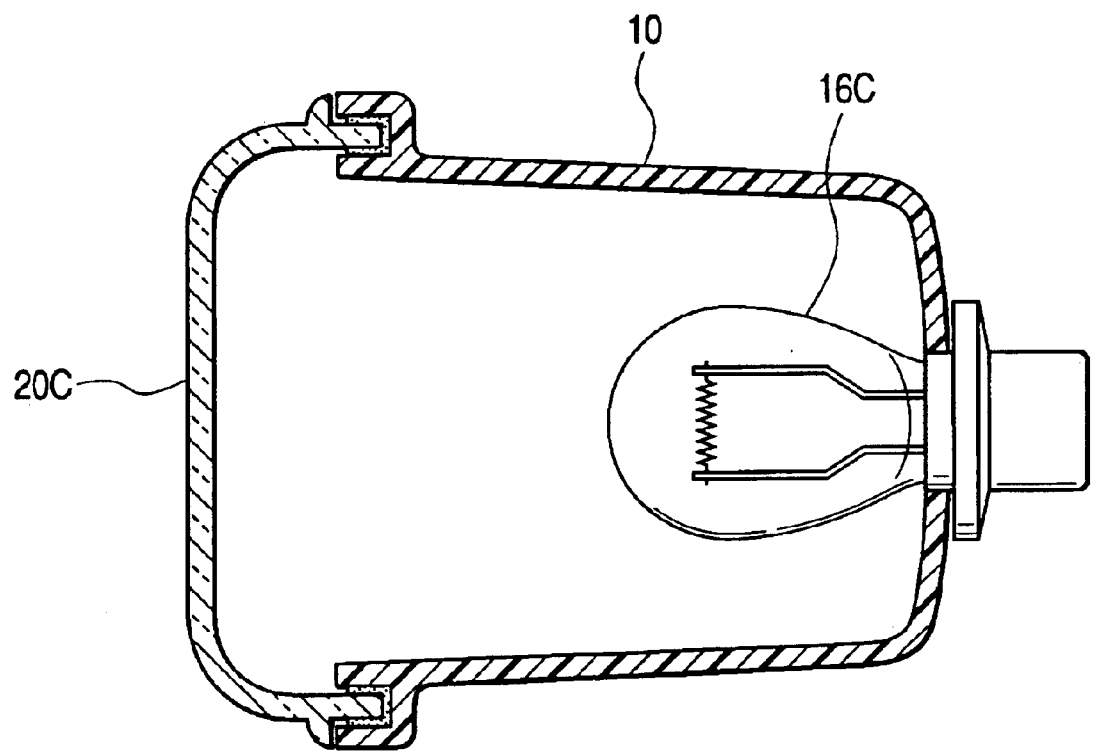
FIG. 9 is a cross-sectional view of a rear fog lamp according to another embodiment of the invention.

FIG. 9 shows a rear fog lamp according to another embodiment of the invention. A pale red lens which is slightly reddish when compared with a clear color is used as a front lens 20C. By means of combination of the front lens 20C with the red bulb 16C, red light can be efficiently emitted. Further, the color of the lens is less noticeable when compared with a conventional red lens, thereby imparting an appearance quality to the lens.

As is evident from the foregoing descriptions, according to the present invention, a vehicle lamp is made by coating a bulb with a red paint film such that the luminous flux is 120±20% 1m, the chromaticity for y is less than 0.335 and z is less than 0.008, and the heat resistance temperature is 350° C. or higher.

A lamp imparted with depth and an appearance of quality can be provided because lamp chambers of the lamp are clearly visible.

Furthermore, Even for a combination lamp having a backing lamp and other marker lamps integrally assembled, a front lens of the combination lamp corresponding to a red marker lamp does not have to be made by the multiple color molding process, thereby curtailing costs.

Further, the entire front lens of the combination lamp is made clear or have some other uniform color such as pale red, and hence the entire combination lamp has a uniform single color in the extinguished state. Hence, in this respect, the combination lamp of the present invention can be differentiated from other combination lamps having a multiple-color-molded front lens or a red inner lens.

What is claimed is:

1. A vehicle lamp comprising:
 a red bulb having an exterior surface coated with a red paint which includes iron oxide as a red pigment,
 wherein a mean particle size of the iron oxide ranges from approximately 10 to 100 nm, and a pigment weight concentration of the iron oxide ranges approximately 60 to 90%.

2. The vehicle lamp according to claim 1, further comprising:
 a front lens disposed in front of the red bulb, and said front lens having a uniform single color or no color.

3. A vehicle lamp comprising:
 a combination lamp having integrated at least a red marker lamp, a backing lamp, and a turn signal lamp, said red marker lamp comprising a red bulb with the red bulb's exterior surface coated with a red paint which includes iron oxide as a red pigment,
 wherein a mean particle size of the iron oxide ranges approximately 10 to 100 nm, and a pigment weight concentration of the iron oxide ranges approximately 60 to 90%.

4. The vehicle lamp according to claim 3, wherein the red marker lamp is a tail lamp.

5. The vehicle lamp according to claim 3, wherein the red marker lamp is a brake lamp.

6. The vehicle lamp according to claim 3, wherein the red marker lamp is a tail-and-brake lamp.

7. The vehicle lamp according to claim 3, wherein the red marker lamp is a rear fog lamp.

8. The vehicle lamp according to claim 3, wherein the combination lamp comprises a front lens with a uniform single color.

9. The vehicle lamp according to claim 3, wherein the combination lamp comprises a front lens that is translucent or pale red.

10. The vehicle lamp according to claim 1 wherein the red paint further comprises a transparent base resin, a volatile base material made of an organic solvent, and an additive, and said base resin acts as a binder having a coat forming characteristic.

11. The vehicle lamp according to claim 3 wherein the red paint further comprises a transparent base resin, a volatile base material made of an organic solvent, and an additive such as a dispersing agent, and said base resin acts as a binder having a coat forming characteristic.

12. A vehicle lamp comprising:
 a red marker lamp including a red bulb with the red bulb's exterior surface coated with a red paint which includes iron oxide as a red pigment,
 wherein a mean particle size of the iron oxide ranges approximately 10 to 100 nm, and a pigment weight concentration of the iron oxide ranges approximately 60 to 90%.

13. The vehicle lamp according to claim 12, wherein the red marker lamp is a tail lamp.

14. The vehicle lamp according to claim 12, wherein the red marker lamp is a brake lamp.

15. The vehicle lamp according to claim 12, wherein the red marker lamp is a tail-and-brake lamp.

16. The vehicle lamp according to claim 12, wherein the red marker lamp is a rear fog lamp.

17. The vehicle lamp according to claim 12, wherein the combination lamp comprises a front lens with a uniform single color.

18. The vehicle lamp according to claim 12, wherein the combination lamp comprises a front lens that is translucent or pale red.

19. The vehicle lamp according to claim 12 wherein the red paint further comprises a transparent base resin, a volatile base material made of an organic solvent, and an additive such as a dispersing agent, and said base resin acts as a binder having a coat forming characteristic.

20. The vehicle lamp according to claim 10 wherein the additive is a dispersing agent.

* * * * *